United States Patent [19]

Vanderveen

[11] 4,341,750

[45] Jul. 27, 1982

[54] CARBON BLACK PRODUCTION

[75] Inventor: John W. Vanderveen, Bartlesville, Okla.

[73] Assignee: Phillips Petroleum Company, Bartlesville, Okla.

[21] Appl. No.: 808,002

[22] Filed: Jun. 20, 1977

[51] Int. Cl.$^3$ .......................... C01B 31/02; C09C 1/48
[52] U.S. Cl. ..................................... 423/450; 423/449; 423/455; 423/456
[58] Field of Search ............... 423/449, 450, 455, 456; 23/259.5

[56] References Cited

U.S. PATENT DOCUMENTS

| | | | |
|---|---|---|---|
| 3,071,443 | 1/1963 | Bellew | 423/450 X |
| 3,117,016 | 1/1964 | Smith | 423/450 X |
| 3,362,790 | 1/1968 | Wood et al. | |
| 3,865,925 | 2/1975 | Mills | 423/450 |

*Primary Examiner*—O. R. Vertiz
*Assistant Examiner*—Gregory A. Heller

[57] ABSTRACT

Carbon black having a low tint residue is produced by periodically varying operating conditions in a carbon black reactor.

17 Claims, 7 Drawing Figures

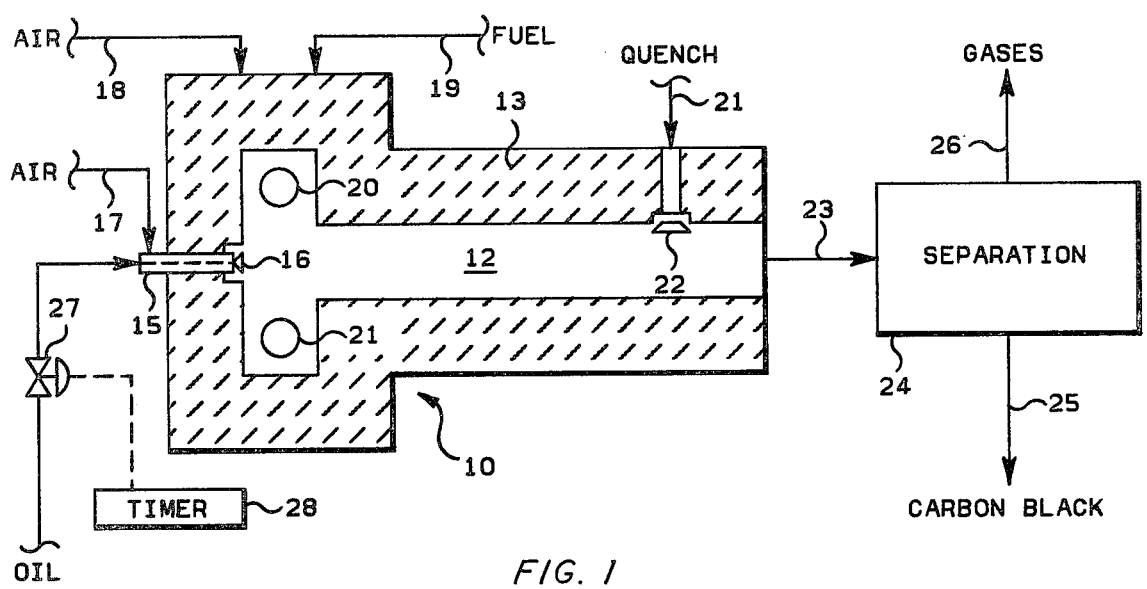
FIG. 1
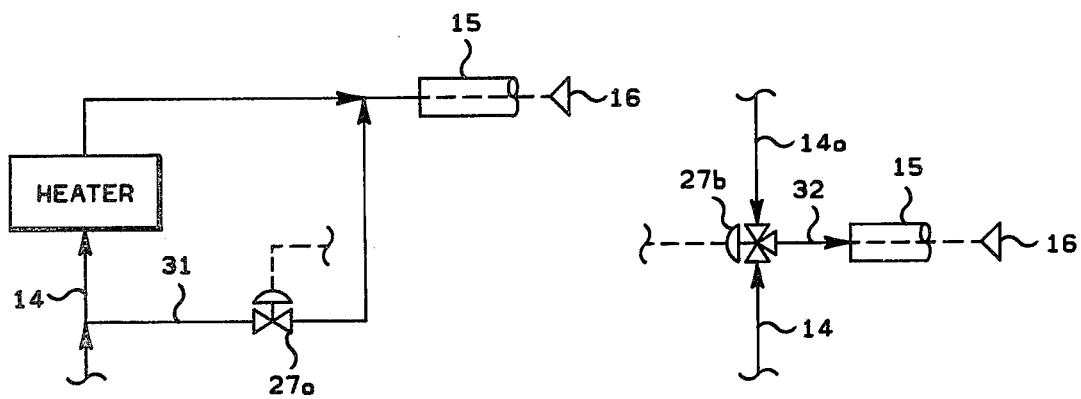
FIG. 2
FIG. 3
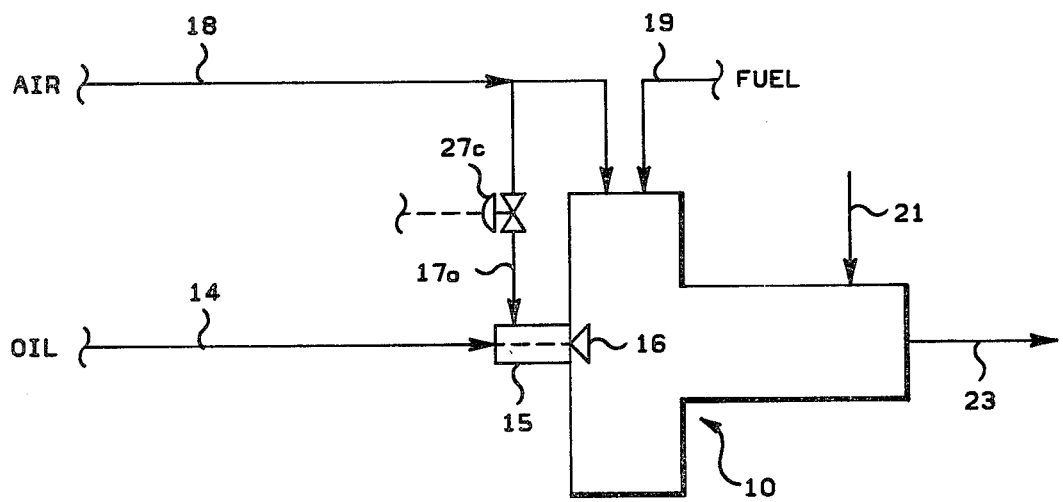
FIG. 4

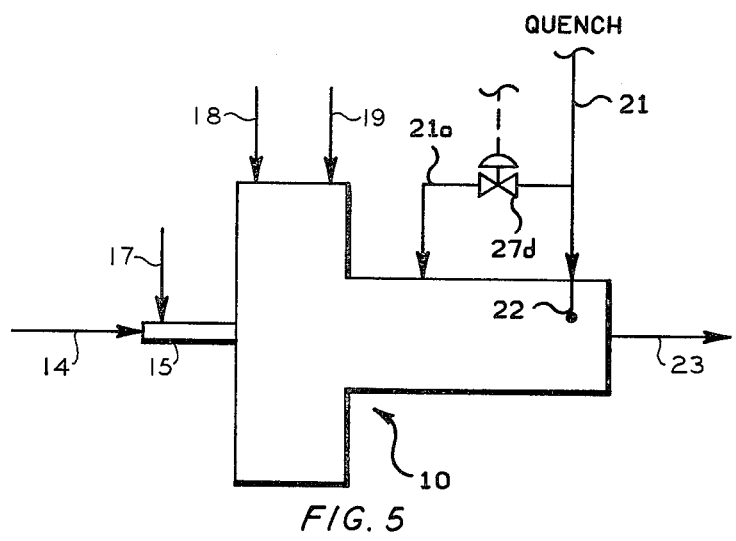
FIG. 5
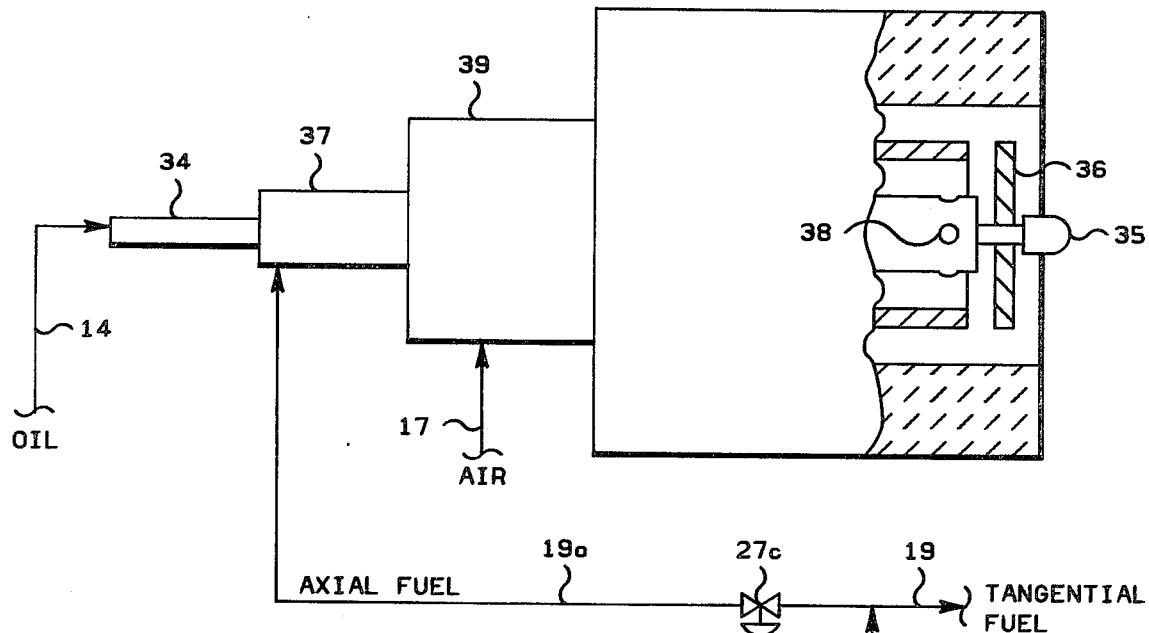
FIG. 6
FIG. 7

CARBON BLACK PRODUCTION

It has recently been found that carbon black having a low tint residue can be employed to advantage in the manufacture of tires. The use of such a black reduces heat buildup in the tires. This invention provides a method for producing carbon black having a low tint residue of below about −6.

Tint residue is defined by the following empirical equation $$TR = T - [56.0 + 1.057 (CTAB) - 0.002745 (CTAB)^2 - 0.2596 (DBP) - 0.201 (N_2SA - CTAB)].$$

In this formula, the abbreviations used have the following meanings, and the properties are measured as described:

TR: Tint residue.
CTAB: Surface area of the carbon black measured as described by J. Janzen and G. Kraus in *Rubber Chemistry and Technology*, 44, 1287 (1971), m$^2$/gm.
N$_2$SA: Surface area of the carbon black measured using nitrogen in accordance with ASTM D-3037-71T, m$^2$/gm.
DBP: This is the dibutylphthalate absorption number and is measured in accordance with ASTM 3493-76, cd/100 gm.
T: Tint value or tinting strength of the carbon black measured by arbitrarily assigning the reference black IRB No. 3 the value of 100; the tint value is measured in accordance with ASTM 3265-75.

It can be seen from the foregoing equation that tint residue is a function of the ASTM nitrogen surface area, the CTAB, the ASTM Tinting Strength, surface area, and ASTM DEP value or structure of the carbon black. These properties can be varied by changing operating conditions in a typical carbon black reactor wherein a carbonaceous feed material, such as an aromatic oil, is decomposed to carbon black by elevating the temperature of the feed within the reactor. As described in U.S. Pat. No. 3,865,925, for example, variables which affect the surface area and/or structure of carbon black include air and fuel rates, feed rate, reactor pressure, rate of addition of an alkali metal, oil spray angle, and aromaticity of the feed oil.

In accordance with the present invention, carbon black having low tint residue is produced in a furnace type carbon black reactor by varying one or more of the reaction conditions from a first set of conditions which produce a carbon black having a first tint value, N$_2$SA, CTAB, and DBP values to a second set of conditions which produce a carbon black having a second tint value, N$_2$SA, CTAB and DBP values. This step of varying the reactor conditions is repeated intervallic, i.e, at intervals, either randomly or periodically, while the produced black is being collected. The frequency at which the conditions are varied is sufficiently high whereby the collected carbon black has a substantially low tint residue value. It is preferred that the tint residue value be less than about −6.

In the accompanying drawing, FIG. 1 is a schematic representation of the carbon black reactor having a first embodiment of this invention incorporated therein.

FIGS. 2 to 7 are schematic representations of additional embodiments of apparatus which can be employed to vary operating conditions within the carbon black reactor.

Referring now to the drawing in detail and to FIG. 1 in particular, there is shown a schematic representation of a typical carbon black reactor 10 of the type described in greater detail in U.S. Pat. No. 2,564,700. The reactor comprises a cylindrical precombustion zone 11 and a reaction zone 12 of smaller diameter. These two zones are surrounded by refractory insulating material 13. A carbonaceous feed material, e.g., hydrocarbon or oil, is introduced through a conduit 14 which communicates with an axially disposed inlet assembly 15 having a nozzle 16 at the downstream end thereof. Air is introduced into zone 11 in an axial direction from a conduit 17 which communicates with inlet assembly 15. This air surrounds the nozzle to cool the feed oil assembly. Additional air and a fuel, such as natural gas, are introduced through respective conduits 18 and 19 which communicate with one or more burners, not shown. The combustion gases from the burners are introduced into precombustion zone 11 through one or more inlet ports 20 in direction generally tangential to the outer wall of chamber 11. These hot combustion gases surround the feed oil and elevate the temperature of the feed oil to a sufficiently high value to decompose the feed oil to form carbon black. A quench fluid, such as water, or cooled gases, is introduced into the reactor through a conduit 21 which communicates with one or more nozzles 22. The effluent from the reactor, which comprises carbon black suspended in gases, is directed through a conduit 23 to conventional separation equipment 24. Carbon black is withdrawn through a conduit 25, and effluent gases are withdrawn through a conduit 26.

The apparatus thus far described constitutes one embodiment of a conventional furnace carbon black reactor. The above-mentioned patent, the disclosure of which is herein incorporated by reference, describes such a reactor in greater detail and discloses suitable operating conditions. In accordance with a first embodiment of this invention, the rate at which the feed oil is introduced into the reactor is varied intervallicly, such as by manipulation of a control valve 27 in oil conduit 24. The opening of the valve 27, and thereby the through flow rate, is adjusted periodically, with a conventional timing device 28 being advantageously employed for this purpose. The timer can comprise a conventional cam-operated unit which provides an output signal to control the opening of valve 27. As will be described hereinafter in greater detail, the opening of the valve can be varied abruptly from a first position to a second position or it can be varied continuously between two positions or any combination thereof. By cyclically changing the flow rate at which the feed oil is introduced into the reactor, the properties of the carbon black produced are varied. This serves to broaden the structure and/or particle size distribution of the black and to lower the tinting strength, and thereby lower the tint residue of the black, as compared with an operation at constant oil flow rate. The oil feed flow rate preferably is varied at least about ± 10% of an average oil feed rate and more preferably between ±10% and ±50% of the average oil feed flow rate.

Instead of an adjustable valve 27, the flow rate of feed oil can be varied by means of a variable delivery pump which is adjusted smoothly or abruptly intervallicly by timer 28.

A second embodiment of apparatus which can be employed to carry out the method of this invention is illustrated schematically in FIG. 2. In this embodiment, the temperature of the feed oil is varied intervallicly to produce low tint residue carbon black. This is accomplished by means of a heater 30 disposed in the feed oil conduit 14. A conduit 31 is connected in parallel with heater 30 so that a portion of the feed oil bypasses the heater. The amount of feed oil which bypasses the heater thus varies the temperature smoothly or abruptly of the feed oil introduced into reactor 10. This is controlled by a valve 27a which is adjusted by a timer, not shown, corresponding to timer 28 of FIG. 1. The oil temperature is preferably between about 0° F. and 600° F. and the temperature is varied preferably at least about 200° F.

In the embodiment of this invention illustrated in FIG. 3, two different feed oils are introduced into the reactor alternately or in a controlled ratio which is varied intervallicly to cause production of low tint residue carbon black. To this end, conduits 14 and 14a are connected to a valve 27b, the outlet of which is connected by a conduit 32 to oil nozzle 16. Different oils are supplied by conduits 14 and 14a. These oils have different BMCI values and thus produce carbon blacks having especially different DBP structures and tinting strengths. Preferably feed oils have a BMCI of between about 90 BMCI and 150 BMCI and the BMCI change based on a volume average is at least about 15 units. Valve 27b is adjusted so that the two oils are introduced alternately into the reactor. As an alternative, valve 27b can be a proportion valve which is adjusted to intervallicly vary the ratio smoothly or abruptly of the two oils being introduced into the reactor.

In the embodiment illustrated in FIG. 4, the properties of the produced carbon black are varied by changing the ratio of air introduced tangentially to the air introduced axially to produce low tint residue black. The amount of air introduced axially is preferably between about 0.02 to 70 volume percent of the total air introduced. The change in the ratio of tangential air to axial air is based on at least about a 10 volume percent, based on total air, change in the axial air for a constant air input. A conduit 17a, having a control valve 27c therein, extends between air inlet conduit 18 and axial inlet 15. By varying the opening of valve 27c, the ratio of the air flows to the two inlets of the reactor can be varied smoothly or abruptly. This serves to change especially the DPB properties as well as CTAB and $N_2SA$ values of the produced carbon black to produce low tint residue black.

In another embodiment, the rate of flow of tangential air can be varied smoothly or abruptly, at constant oil rate to realize a decrease in tint residue of the black.

The properties of carbon black produced in a reactor of the type shown in FIG. 1 can be varied by introducing quench fluid at different points within the reactor to affect aftertreat (increase $N_2SA$). A control system based on this method of operation is illustrated in FIG. 5. The reactor is provided with a conduit 21a which extends between quench conduit 21 and the interior of reactor 10 at a point upstream from the location of quench nozzle 22 of FIG. 1. A control valve 27d is disposed in conduit 27a to regulate smoothly or abruptly the ratio of quench liquid introduced into the reactor at the two locations to produce low tint residue black. Preferably, the change in the quench ratio is based on a change in one of the quench fluid input of at least about 10% volume percent of the total quench fluid being used for a constant quench fluid input.

In FIG. 6, there is shown a reactor having a modified burner assembly. Oil conduit 14 communicates with a conduit 34 which extends into the reactor and has a nozzle 35 on the end thereof. A radial baffle plate 36 extends outwardly from conduit 34 adjacent nozzle 35. A conduit 37 surrounds conduit 34 and terminates at a location adjacent baffle plate 36. A fuel is introduced into conduit 37 from a conduit 19a. Conduit 37 is provided with openings 38 adjacent the inner end thereof to disperse the fuel behind baffle plate 36. Axial air from conduit 17 is introduced through a conduit 39 which surrounds conduit 37. This results in the fuel being burned at the inlet of the reactor to supply additional heat to decompose the feed oil. A valve 27c is disposed in conduit 19a to regulate the ratio at which fuel is introduced tangentially and axially. A change of this ratio either smoothly or abruptly also changes the properties of the carbon black produced which cause the result of low tint residue carbon black. Preferably, axial fuel comprises about 0 to 70 volume percent of the total fuel and the change in the ratio of axial fuel to tangential fuel is based on a change in axial fuel of at least about 10 volume percent of the total fuel for a constant total fuel input.

In the embodiment of this invention illustrated in FIG. 7, the pressure within reactor 10 is varied intervallicly to change the properties of the produced carbon black. This is accomplished by means of an adjustable valve 37f which is disposed in discharge or outlet conduit 23. By smoothly or abruptly varying the amount of opening of valve 27, the pressure within the reactor is changed, and this in turn changes the properties of the produced carbon black, resulting in production of low tint residue carbon black. The change in reactor pressure is at least about 3 psi.

In all of the illustrated embodiments of this invention, the various valves 27 are manipulated by a timer corresponding to timer 28 of FIG. 1.

The timer for a cycle of change of variables can be condition one for about 2 seconds to 15 minutes and then condition two for about 2 seconds to 15 minutes.

EXAMPLE

|  | "Typical" Runs | |
|---|---|---|
|  | I Conventional | II Inventional |
| Tangential Air, MSCF/Hr., | 200 | 200 |
| Axial Air, MSCF/Hr., | 6 | 6 |
| Feed, Gal/Hr., | 300 | 340-180[1] |
| Tangentail Fuel Gas, MSCF/Hr., | 17 | 17 |
| Product: |  |  |
| Tinting Strength[2] | 113.1 | 105.6 |
| Photelometer[3] | 90 | 90 |
| $N_2SA$, $m^2/gm$[4] | 115 | 125 |
| CTAB, $m^2/gm$[5] | 110 | 120 |
| 24M4, DBP, cc/100 gm[6] | 100 | 95 |
| Tint Residue[7] | 0 | −12 |

[1]5 cycles per minute; 9 seconds on 340 gph, 3 seconds on 180 gph; average is 300 gph as in (I) Conventional;
[2]ASTM D-3265-76;
[3]ASTM D-1618-75;
[4]ASTM D-3037-76;
[5]Janzen J. and Kraus G., Rubber and Chemistry and Technology, 44,1287 (1971);
[6]ASTM D-3493-76;
[7]Tint Residue, as defined hereinbefore.

The above calculated example illustrates operability of the form of the invention illustrated in FIG. 1.

It is to be understood that while there has been illustrated and described certain forms of the invention, it is not to be limited to the specific form or arrangement of parts or steps herein described and shown except to the extent that such limitations are found in the claims.

What is claimed and desired to be secured by Letters Patent is:

1. In a process for producing carbon black by introducing a carbonaceous feed material, air, fuel and a quench fluid into a reactor, combusting at least a portion of the fuel with a portion of the air to heat the feed to a temperature sufficiently high to decompose the feed to produce a carbon black effluent, cooling the effluent with the quench fluid, removing the carbon black effluent from the reactor, and collecting the carbon black thus produced, wherein operating conditions include the rates at which the carbonaceous feed material, air, fuel and quench fluid are introduced; the positions from which the carbonaceous feed material, air, fuel and quench fluid are introduced; the characteristics of the carbonaceous feed material, air, fuel and quench fluid and the pressure and temperature at which the reactor is operated; the improvement which comprises:
   (a) varying said operating conditions from a first set of conditions which produce a carbon black having a first tint value to a second set of conditions which produces a carbon black having a second tint value by varying at least one of said operating conditions, and
   (b) repeating step (a) at an intervallic interval in the range of from about 2 seconds to about 15 minutes, the frequency of repetition being sufficiently high so that the collected carbon black has a substantially constant tint residue, and the amount by which said set of operating conditions is varied being sufficiently large so that the collected carbon black has a tint residue of less than about −6.

2. A process as in claim 1 wherein said operating conditions are smoothly varied from said first set to said second set at a regular interval.

3. A process as set forth in claim 1 wherein the rate of introducing the feed is varied while maintaining the other operating conditions substantially constant.

4. A process as set forth in claim 1 wherein the operating condition varied includes the temperature of the introduced feed.

5. A process as set forth in claim 1 wherein the operating condition varied includes sequentially introducing first and second carbonaceous feed materials with one having one BMCI and the other having another BMCI.

6. A process as set forth in claim 1 wherein air is introduced both axially and tangentially into the reactor and the operating condition varied is the ratio of the tangentially introduced air to the axially introduced air.

7. A process as set forth in claim 1 wherein quench fluid is introduced into the reactor at a plurality of positions along the length thereof and the operating condition varied is the ratio of the quench fluid introduced at one position to the quench fluid introduced at another position.

8. A process as set forth in claim 1 wherein the operating condition varied includes the reactor pressure.

9. A process as set forth in claim 8 wherein the reactor pressure is varied by controlling flow rate of the effluent through a valve in a discharge of the reactor.

10. A process as set forth in claim 1 wherein fuel is introduced into the reactor at a plurality of positions with said fuel being combusted for heating the feed and the operating condition varied is the ratio of the fuel introduced at one position to the fuel introduced at another position.

11. A process as set forth in claim 3 wherein the variation of the feed rate introduction is at least about ±10 percent of the average feed input.

12. A process as set forth in claim 4 wherein the temperature is varied at least about 200° F.

13. A process as set forth in claim 5 wherein the change in BMCI is at least about 15 units based on a volume average.

14. A method as set forth in claim 6 wherein the ratio of tangential air to axial air is varied at least about 10 volume percent, based on total air, of change in the axial air for a constant air input.

15. A method as set forth in claim 8 wherein the quench ratio variation is based on a change in one of the quench fluid inputs of at least about 10 volume percent of the total quench fluid input for a constant quench fluid input.

16. A method as set forth in claim 8 wherein the reactor pressure is varied at least about 3 psi.

17. A method as set forth in claim 10 wherein the fuel is introduced both axially and tangentially wherein the ratio of axial fuel to tangential fuel is varied with the variation being based on a change in axial fuel of at least about 10 volume percent of the total fuel input for a constant total fuel input.

* * * * *